(12) United States Patent
Jun et al.

(10) Patent No.: US 7,274,366 B2
(45) Date of Patent: Sep. 25, 2007

(54) METHOD AND APPARATUS FOR DETECTING EDGE

(75) Inventors: Sung Bae Jun, Seoul (KR); Kyoung Ro Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 697 days.

(21) Appl. No.: 10/263,042

(22) Filed: Oct. 1, 2002

(65) Prior Publication Data

US 2003/0128213 A1    Jul. 10, 2003

(30) Foreign Application Priority Data

Dec. 29, 2001    (KR) .......................... 2001-0088262

(51) Int. Cl.
*G06T 11/20* (2006.01)
(52) U.S. Cl. ..................... 345/441; 345/611; 345/612; 345/649; 345/587
(58) Field of Classification Search ................ 345/441, 345/443, 440, 611, 612, 649, 587
See application file for complete search history.

(56) References Cited

U.S. PATENT DOCUMENTS

| | | | | | |
|---|---|---|---|---|---|
| 5,787,204 | A | * | 7/1998 | Fukuda ....................... | 382/233 |
| 6,148,115 | A | * | 11/2000 | Mackinnon et al. ........ | 382/266 |
| 6,154,574 | A | * | 11/2000 | Paik et al. .................. | 382/255 |
| 2003/0053711 | A1 | * | 3/2003 | Kim ............................ | 382/268 |

* cited by examiner

*Primary Examiner*—Matthew C. Bella
*Assistant Examiner*—Mike Rahmjoo
(74) *Attorney, Agent, or Firm*—Lee, Hong, Degerman, Kang & Schmadeka

(57) ABSTRACT

The present invention relates to a method and apparatus for detecting an edge in an image or video. The present invention can detect an edge more quickly by detecting edge information by using the absolute values and codes of two coefficients (AC01, AC10) in the DCT domain. In addition, the present invention can detect a more rapid and accurate edge by using the edge detection method using two coefficients as a pre-filter and using the edge detection method using a spatial filter as a post-filter.

22 Claims, 8 Drawing Sheets

$AC_{01}$ $AC_{10}$

Fig. 3
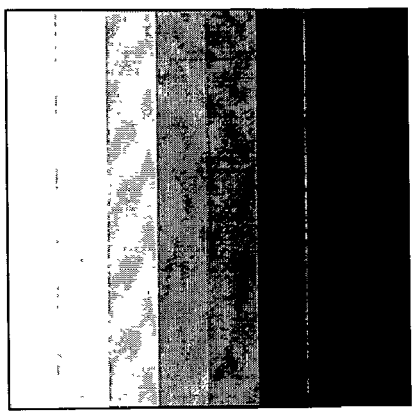
$AC_{01}$
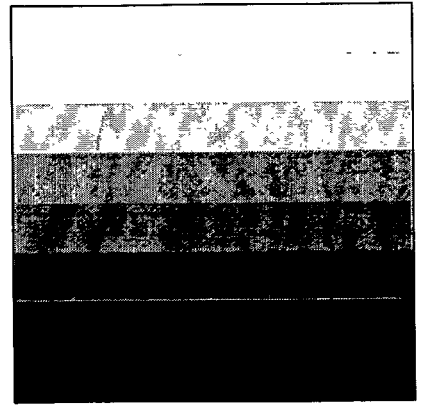
$AC_{10}$

Fig. 4
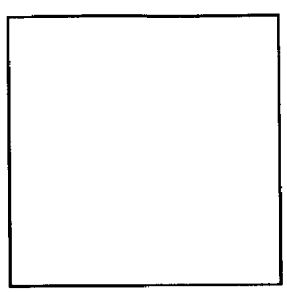
0
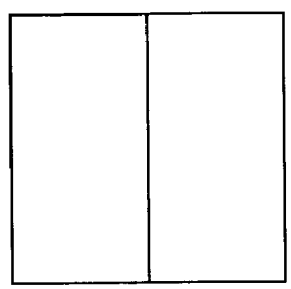
1
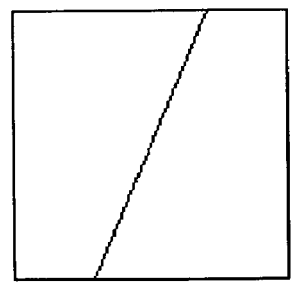
2
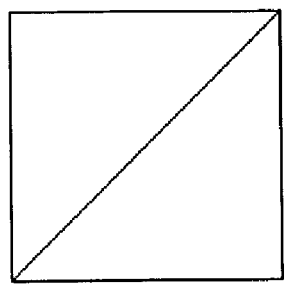
3
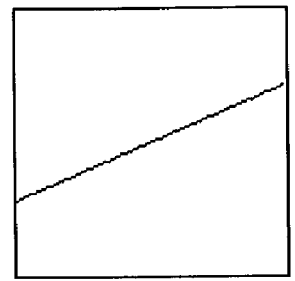
4
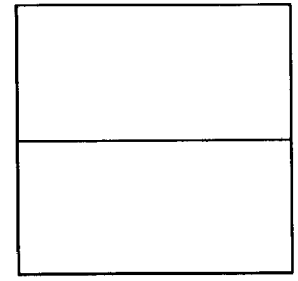
5
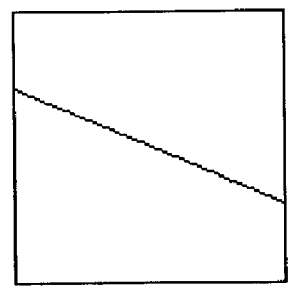
6
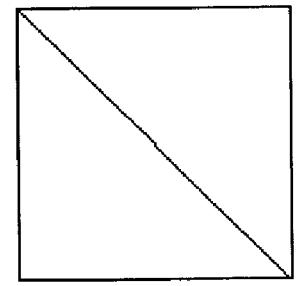
7
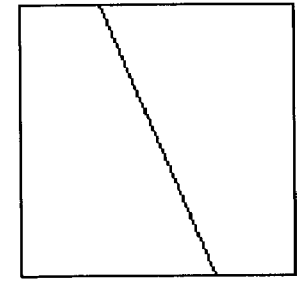
8

Fig. 5 nType=1

$abs(AC_{01}) > nT1$ && $abs(AC_{10}) < nT2$ nType=2

$abs(AC_{01}) - abs(AC_{10}) > nT6$ && $abs(AC_{01}) > nT7$ && $AC_{01} * AC_{10} > 0$ nType=3

$abs(abs(AC_{10}) - abs(AC_{01})) < nT3$ && $abs(AC_{01}) > nT4$ && $abs(AC_{10}) > nT4$ $AC_{01} * AC_{10} > 0$ nType=4

$abs(AC_{10}) - abs(AC_{01}) > nT6$ && $abs(AC_{10}) > nT7$ && $AC_{01} * AC_{10} > 0$ nType=5

$abs(AC_{10}) > nT1$ && $abs(AC_{01}) < nT2$ nType=6

$abs(AC_{10}) - abs(AC_{01}) > nT6$ && $abs(AC_{10}) > nT7$ && $AC_{01} * AC_{10} < 0$ nType=7

$abs(abs(AC_{10}) - abs(AC_{01})) < nT3$ && $abs(AC_{01}) > nT4$ && $abs(AC_{10}) > nT4$ $AC_{01} * AC_{10} < 0$ nType=8

$abs(AC_{01}) - abs(AC_{10}) > nT6$ && $abs(AC_{01}) > nT7$ && $AC_{01} * AC_{10} < 0$

METHOD AND APPARATUS FOR DETECTING EDGE

BACKGROUND OF THE INVENTION

1. Field of the Invention

The present invention relates to a method and apparatus for detecting an edge in an image or video.

2. Description of the Related Art

A method for detecting an edge from an image or video such as JPEG, MPEG and H.26x, which describes image and video compression schemes, is very important in image and signal processing techniques. Edge detection has been studied a lot because it is used as a basic input in many other applications. The applications of the edge detection are used for various forms of image enhancement and are also used for object segmentation. Additionally, in the recent time, they are used for image retrieval and the shot segmentation algorithm for dividing video sequences in editing units. Also, they are usefully used for motion extraction and are used for text detection as a useful feature element.

Further, the applications of the edge detection can be usefully used for super resolution image restoration, which have been recently studied. Most of all, edge components are important factors in determining the characteristics of an image.

In the recent time, requests for transmitting and receiving an image or video via a network have been increased. To solve the problem of low communication bandwidth and efficiently store image or video data of a large volume, the image compression technique has been developed. A representative method of image compression is a JPEG codec, and methods of moving image compression include MPEG and H.26x schemes. The general principle of image and moving image compression currently used is to compress an image using the spatial redundancy by transforming the image in the spatial domain to the image in the frequency domain. At this time, the most widely used transform method is a discrete cosine transform (DCT).

In the DCT method, an original image consists of a plurality of blocks, each having m pixel×n pixel. Typically, the size of m pixel×n pixel can be selected as 4×4, 4×8, 8×8, 8×16 and the like according to which system is to be applied. Here, 8×8 is set as one block for explanation.

Thus in the DCT method, a data compression process is respectively applied to each of these blocks.

The plurality of blocks of 8×8 pixels in the original image is encoded by the DCT coding. The DCT transforms each of the blocks in the spatial domain into a frequency domain.

The 8×8 blocks can be transformed into 8×8 coefficient blocks.

In the 8×8 coefficient blocks (generally, indicated in a matrix), the coefficients are represent the content of the original 8×8 blocks.

As shown in FIG. 1, most of the information in the original block is concentrated on one coefficient. Such a coefficient is called a DC coefficient, which is the average value of the 8×8 blocks. The DC coefficient is positioned at a matrix (0,0) component.

The coefficients (AC10, AC20, AC30, etc.) arranged in the horizontal direction with respect to the DC coefficient contain horizontal edge components, and the coefficients (AC01, AC02, AC03, etc) arranged in the vertical direction contain vertical edge components.

As the conventional edge detection method, the high pass filtering method using a spatial filter in the spatial domain is widely used.

FIG. 2 illustrates one example of horizontal edge detection using a spatial filter, which comprises an edge detection filter used in the spatial filtering method, an original image and an edge image reflecting an edge. Here, the original image is the image from which an edge is detected. Additionally, as the edge detection filter, a mask is used.

In the edge detection method using the spatial filter, typically, the pixel of an edge image is obtained with respect to each pixel of the original image by using the mask.

More specifically, the pixel of the original image corresponds to one pixel of the edge image. At this time, in case of using a 3×3 matrix mask, it is necessary to perform multiplication operation 9 times and add operation 8 times in order to obtain the edge of one pixel. Such operations must be performed with respect to all pixels to obtain the edge image. Additionally, since the edge component in one direction is obtained by one scanning by such a mask, it requires applying different masks in the same manner to obtain edges in four or eight directions (masks as many as the number of edge directions have to be provided). That is, the edge detection method using the spatial filter is advantageous in that an accurate edge can be detected, but it requires several masks and its execution speed is very low according to the complexity of an operation. In other words, such a spatial filtering method is advantageous in that an accurate edge component can be detected, but it requires many operations. Thus, this method has many restrictions for use in various systems.

Actually, in many applications, the inputting of edge components approximate to actual edge components will be enough, rather than requesting accurate edge components. Also, edge detection of a high speed is needed.

Accordingly, there occurs a need for an algorithm for detecting edges which are approximate to actual edge components and which can be widely used in many applications by the simplest processing in the compression domain using the DCT.

SUMMARY OF THE INVENTION

An object of the invention is to provide a method and apparatus for detecting an edge of an image or video in a system for processing an image or video in block units, which can detect an edge directly from the DCT domain widely used in image or moving image compression.

Particularly, a method and apparatus for detecting an edge according to the invention can detect directly from DCT domain, which is being used very widely in image or video compression.

The above object and advantages of the invention are achieved by providing a method for detecting an edge, which produces edge information by comparing the absolute values and codes of a first edge coefficient (AC01) indicating a mostly vertical edge and a second edge coefficient (AC10) indicating a mostly horizontal edge.

The edge information is the strength, position or direction of an edge and can be mapped with an eight-directional edge index containing horizontal, vertical and diagonal lines.

According to another aspect of the present invention, a method for detecting an edge includes the steps of: extracting a first edge coefficient (AC01) and a second edge coefficient (AC10) reflecting the edge of an original image in the DCT domain; comparing the absolute values and codes of the first edge coefficient (AC01) and the second edge coefficient (AC10); and producing edge information on the original image according to the result of the comparison.

The first edge coefficient indicates a mostly vertical edge and the second edge coefficient indicates a mostly horizontal edge.

According to further another aspect of the present invention, a method for detecting an edge includes the steps of: producing first edge information by using the absolute values and codes of the first edge coefficient (AC01) and the second edge coefficient (AC10) reflecting an edge for each of the blocks of the original image in the DCT domain; and producing second edge information by using a spatial filter with respect to the original image based on the first edge information.

The step of producing the second edge information may includes the steps of: restoring the original image based on the blocks from which the first edge information is produced; and producing the second edge information by using the spatial filter with respect to each of the blocks of the restored image.

The step of producing the second edge information may includes the steps of: restoring the original image; and producing the second edge information by applying the spatial filter only with respect to the block from which the first edge information is produced.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings, in which like reference numerals refer to like elements wherein:

FIG. 3 illustrates the edge state of AC01 and AC10 among the coefficients by the DCT coding;

FIG. 4 illustrates an edge index in accordance with the present invention;

FIG. 5 illustrates the relation between two coefficients and edge information in accordance with the present invention;

DETAILED DESCRIPTION OF THE PREFERRED EMBODIMENT

Figure 1:
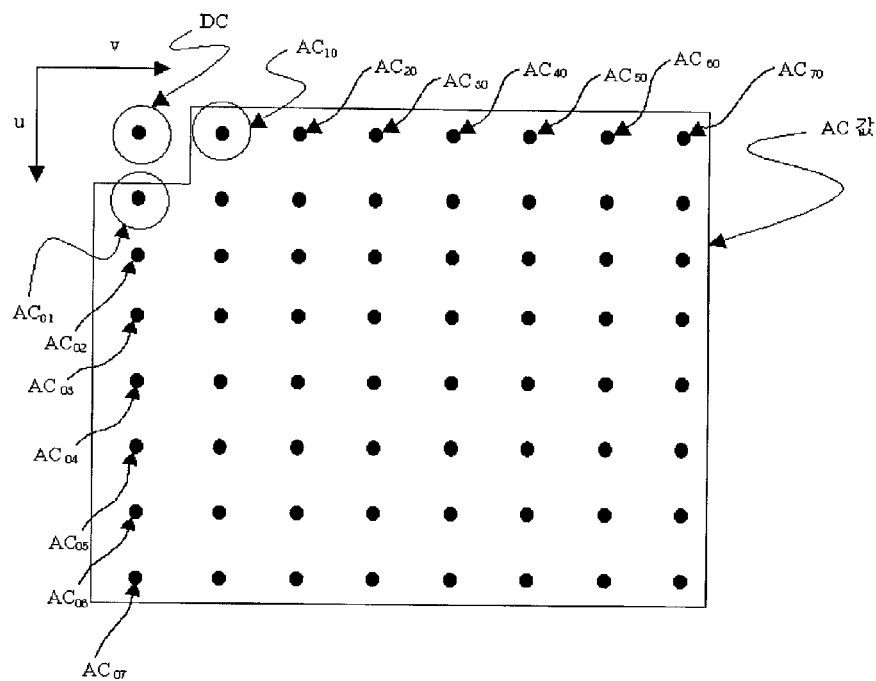
FIG. 1 illustrates 8×8 coefficient blocks by the DCT coding.
Figure 2:
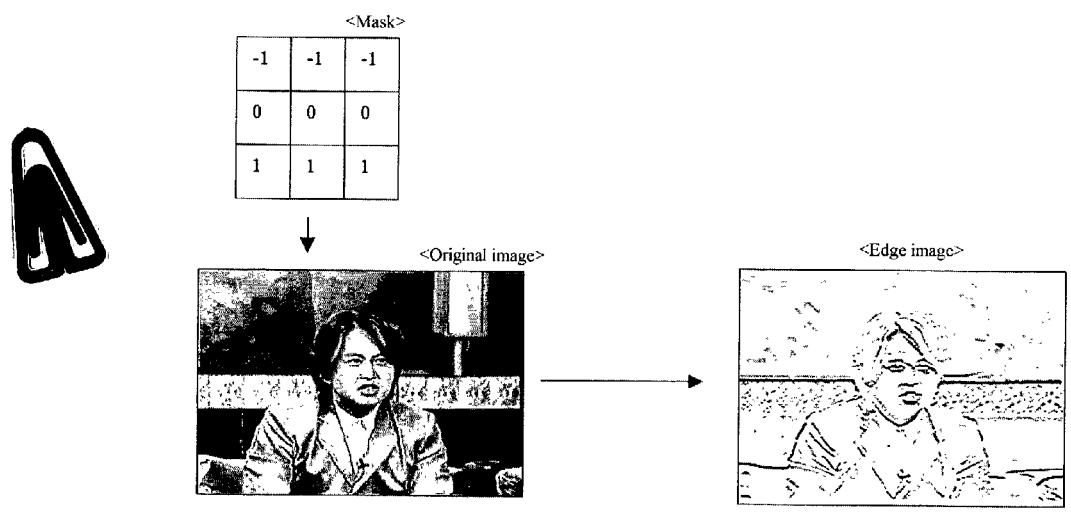
FIG. 2 illustrates the horizontal edge detection method utilizing a spatial filter.

The following detailed description will present a preferred embodiment of the invention in reference to the accompanying drawings.

As explained above, one 8×8 block of an original image is transformed into an 8×8 coefficient block by a DCT coding. In thusly transformed 8×8 matrix, the (0, 0) component is a DC coefficient containing most of the information of one 8×8 block of the original image and the other components are represented as AC coefficients.

In the present invention, by using only AC01 and AC10 among the AC coefficients, an edge having an accuracy of a high level can be detected.

FIG. 3 illustrates edges of AC01 and AC10 among the coefficients by the DCT coding in accordance with the present invention. As shown in FIG. 3, AC01 indicates a mostly vertical edge, and AC 10 indicates a mostly horizontal edge.

Generally, when the original image is DCT-coded, from viewpoint of the characteristics of the DCT, AC01 is shown largely in the block which has a mostly vertical edge while AC10 is shown largely in the block which has a mostly horizontal edge.

FIG. 4 illustrates an edge index in accordance with the present invention. As shown in FIG. 4, the blocks with no edge are regarded as index 0, and the remaining 8 edge indexes are determined according to the direction of edges. Here, the reason why 8-directional edge indexes are expressed is because most of edge detection algorithms are based on 8-directional edges and only the 8-directional edges will be enough to express the characteristics of an image.

FIG. 5 illustrates the relation between two coefficients (AC01, AC10) and edge information in accordance with the present invention. Hereinafter, AC01 and AC10 are referred to as a first edge coefficient and a second edge coefficient. As shown in FIG. 5, in the present invention, it is possible to detect edge information within a short execution time from each element arrangement of a vector consisting of two coefficients, i.e., the first edge coefficient and the second edge coefficient. In the edge detection method in accordance with the present invention, edge information containing the strength, position or direction of an edge can be detected quickly by comparing the absolute values and codes of the first edge coefficient and second edge coefficient.

As explained above, the first edge coefficient has a large absolute value in the portion which has a mostly vertical edge, and the second edge coefficient has a large absolute value in the portion which has a mostly horizontal edge. Additionally, the difference between the absolute values (abs) of the first edge coefficient and second edge coefficient or abs (AC01/AC10) represents the direction of an edge. Whether the first edge coefficient is large and whether the second edge coefficient is large represent that how an edge is close to a vertical or horizontal edge. Each of the absolute values of the first edge coefficient and second coefficient value represents the intensity of an edge, that is, the sharpness of the edge.

The following Pseudo Code describes the algorithm for obtaining an edge index.

```
int GetEdgeType(AC_01,AC_10)
{
    int    nType=0;
    int    nDiff = abs(abs(AC_10)-abs(AC_01));
    if(abs(AC_01)>nT1 && abs(AC_10)<nT2)    nType=1;  // vertical edge
    else if(abs(AC_10)>nT1 && abs(AC_01)<nT2) nType=5;
    //  horizontal edge
    // if the absolute values of AC_01 and AC_10 are more than
    a predetermined level
and the difference between the absolute values is small.
    // edge close to 45 degrees or 135 degrees
    else if(nDiff<nT3 && abs(AC_01)>nT4 && abs(AC_10)>nT4)
```

-continued

```
{
    if(AC_01>0 && AC_10>0)        nType=3;
    if(AC_01>0 && AC_10<0)        nType=7;
    if(AC_01<0 && AC_10>0)        nType=7;
    if(AC_01<0 && AC_10<0)        nType=3;
}
// if the difference between the absolute values of AC_01 and AC_10
   is more than a
predetermined level and it is a mostly horizontal edge component case.
// edge close to 22.5 degrees or 157.5 degrees.
else if(abs(AC_10)-abs(AC_01)>nT6 && abs(AC_10) >nT7)
{
    if(AC_01>0 && AC_10>0)        nType=4;
    if(AC_01>0 && AC_10<0)        nType=6;
    if(AC_01<0 && AC_10>0)        nType=6;
    if(AC_01<0 && AC_10<0)        nType=4;
}
// if the difference between the absolute values of AC_01 and AC_10
   is more than a
predetermined level and if it is a mostly vertical edge component case.
// edge close to 67.5 degrees or 112.5 degrees
else if(abs(AC_01)-abs(AC_10)>nT6 && abs(AC_01) >nT7)
{
    if(AC_01>0 && AC_10>0)        nType=2;
    if(AC_01>0 && AC_10<0)        nType=8;
    if(AC_01<0 && AC_10>0)        nType=8;
    if(AC_01<0 && AC_10<0)        nType=2;
}
// if there is no particular edge component detected.
else                              nType=0;
return nType;
}
```

In the algorithm for obtaining the index of an edge, nT1-nT7 represents threshold value and nType represents an edge index.

The above algorithm for obtaining an edge index will now be described in detail.

A vertical edge (nType=1) occurs when the absolute value of AC01 is larger than nT1 and the absolute value of AC10 is smaller than nT2 [abs($AC_{01}$)>nT1 && abs($AC_{10}$)<nT2]. That is, if AC10, the second edge coefficient, is closed to 0 and the absolute value (abs) of the first edge coefficient (AC01) is relatively very large, a vertical edge is detected by modeling the occurrence of a vertical edge component (index=1).

On the contrary, a horizontal edge (nType=5) occurs when the absolute value of AC10 is larger than nT1 and the absolute value of AC01 is smaller than nT2 [abs ($AC_{10}$)>nT1 && abs($AC_{01}$)<nT2]. That is, if AC01, the first edge coefficient, is closed to 0 and the absolute value (abs) of the second edge coefficient (AC10) is relatively very large, a vertical edge is detected by modeling the occurrence of a vertical edge component (index=5).

If the absolute values of AC01 and AC10 are similar and both absolute values are more than a threshold value, there is an edge component inclined at around 45 or 135 degrees (nType=3 or nType=7).

In the Pseudo Code, if the difference between the absolute values of AC01 and AC10 is smaller than nT3, it is considered as a model of the case where the absolute values of AC01 and AC10 are similar. This can be substituted by the case where the value (abs($AC_{10}$)/abs($AC_{01}$)), which is given by dividing the absolute value of the second edge coefficient by the absolute value of the first edge coefficient, is between two threshold values around 1 [1−nT5<abs($AC_{10}$)/abs($AC_{01}$)<1+nT5].

That is, if the absolute values of the two edge coefficients are similar and both edge coefficient values are larger than nT4 [(abs(abs($AC_{10}$)−abs($AC_{01}$))<nT3 && (abs($AC_{01}$)>nT4) && (abs($AC_{10}$)>nT4)], edge components at an angle of nearly 45 or 135 degrees occur. At this time, whether the edge component is at an angle of nearly 45 degrees or 135 degrees is determined according to the code of $AC_{10}$ and $AC_{01}$. That is, if the codes of the two edge coefficients are the same ($AC_{01}*AC_{10}$>0), edges at an angle of nearly 45 degrees occur (index=3). If the codes of the two edge coefficients are different ($AC_{01}*AC_{10}$<0), edges at an angle of nearly 135 degrees occur (index=7).

If the difference between the absolute values of the first and second edge coefficients is large and the absolute value of the large edge coefficient is more than a predetermined level, edges inclined toward a horizontal or vertical line occur (nType=2, nTtype=4, nType=6, nType=8).

That is, if the absolute value of the second edge coefficient ($AC_{10}$) is larger than that of the first edge coefficient ($AC_{01}$), the difference between them is larger than nT6 and the absolute value of the second edge coefficient is larger than nT7, edge components at an angle of nearly 22.5 degrees or 157.5 degrees occur [abs($AC_{10}$)−abs($AC_{01}$)>nT6 && abs($AC_{10}$)>nT7]. At this time, if the codes of the two edge coefficients are the same ($AC_{01}*AC_{10}$>0), edges at an angle of nearly 22.5 degrees occur (index=4), or if the codes of the two edge coefficients are different ($AC_{01}*AC_{10}$<0), edges at an angle of 157.5 degrees occur (index=6).

If the absolute value of the first edge coefficient ($AC_{01}$) is larger than that of the second edge coefficient ($AC_{10}$), the difference between them is larger than nT6 and the absolute value of the first edge coefficient ($AC_{01}$) is larger than nT7, edge components at an angle of nearly 67.5 or 112.5 degrees occur [abs($AC_{01}$)−abs($AC_{10}$)>nT6 && abs($AC_{01}$)>nT7]. At this time, if the codes of the two edge coefficients are the same ($AC_{01}*AC_{10}$>0), edges at an angle of nearly 67.5 degrees occur (index=2), or if the codes of the two edge coefficients are different ($AC_{01}*AC_{10}$<0), edges at an angle of 112.5 degrees occur (index=8). Further, in a case where no edge is detected by the above edge detection method, it means that there exists no edge component dominant in the corresponding block (index=0).

Figure 6A:
FIG. 6 is a drawing for comparing the edge image of the present invention and the conventional edge image using a spatial filter.
Figure 6B:
Figure 6C:
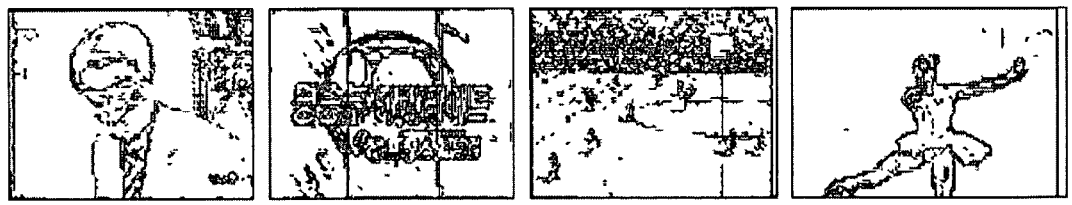

FIG. 6 is a drawing for comparing the edge image of the present invention and the conventional edge image using a spatial filter. FIG. 6A shows the conventional edge image using the spatial filter, FIG. 6B shows the original image and FIG. 6C shows the edge image extracted by the edge detection algorithm of the present invention. As shown in FIG. 6A, the conventional edge image using the spatial filter is advantageous in that more accurate edge is detected. However, it cannot detect edges in specific portions well and has relatively many noises. On the contrary, as shown in FIG. 6C, the edge image extracted by the edge detection algorithm of the present invention detects edges well and has little noises though the accuracy is relatively low.

Therefore, the edge image extracted using two coefficients in the DCT domain can be utilized as an important input means for shot segmentation, super resolution image restoration, object segmentation, text extraction, motion extraction, image enhancement and the like.

Additionally, in the edge detection method using two coefficients in the DCT domain in accordance with the present invention, the execution speed is very high as compared to the conventional edge detection method using the spatial filter. Thus a two-state edge detection algorithm can be implemented, which uses as a pre-filter the edge detection method using two coefficients of the present invention and uses as a post-filter the edge detection method using the spatial filter. In the thusly hybridized edge detection algorithm, an attempt for speed-up is made by the pre-filter and the accuracy can be increased by the post-filter.

Figure 7:
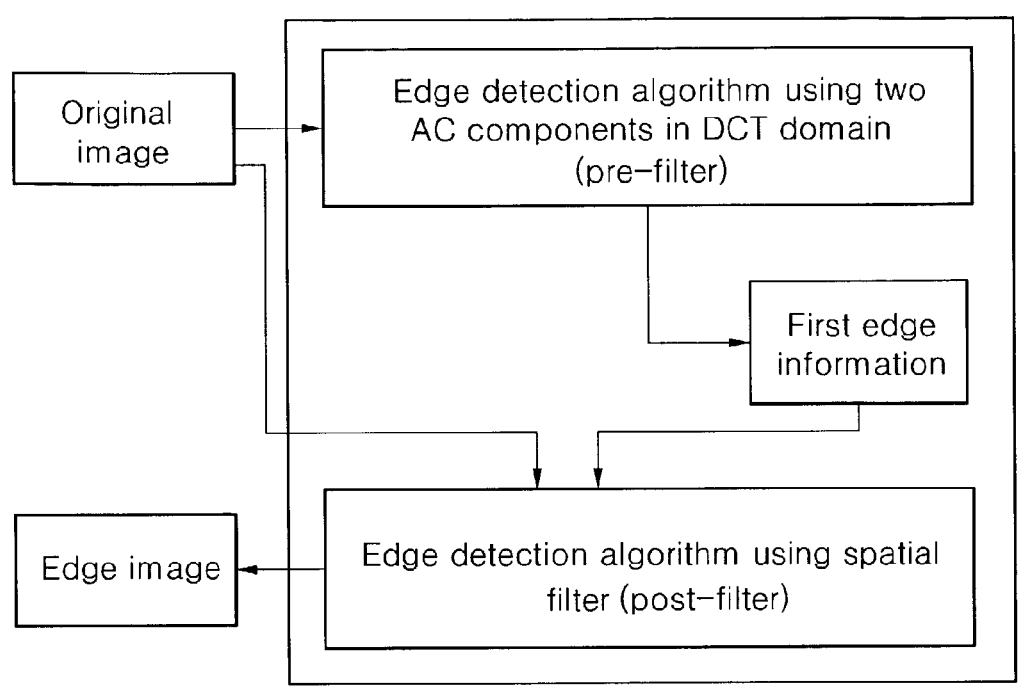
FIG. 7 is a block diagram for explaining the general idea of an edge detection apparatus.

FIG. 7 is a block diagram for explaining the general idea of an edge detection apparatus. The above-mentioned block diagram illustrates the general idea of a hybrid edge detector which hybridizes the pre-filter for detecting edges using two coefficients and the post-filter for detecting edges using the spatial filter. As shown in FIG. 7, the pre-filter produces first edge information while scanning each block from an original image segmented into a plurality of blocks, and the post-filter produces second edge information using the spatial filter only with respect to the block from which an edge is detected based on edge information.

That is, the pre-filter produces the first edge information from the original image using two coefficients (AC01, AC10). As described above, when a DCT coding is carried out, the original image is segmented into a plurality of blocks. Thus the pre-filter compares the absolute values and codes of two coefficients in each of the blocks of the original image, and produces the first edge information containing the strength, position or direction of an edge according to the result of the comparison, At this time, the first edge information can be mapped with an eight-directional edge index containing horizontal, vertical and diagonal lines.

The post-filter produces the second edge information using the spatial filter only with respect to the block from which an edge is detected based on the first edge information. The produced second edge information can be processed to be outputted as an edge image. At this time, when only edges in the corresponding direction are detected with reference to the directions of the edges contained in the first edge information, the edges can be detected at a higher speed.

Figure 8:
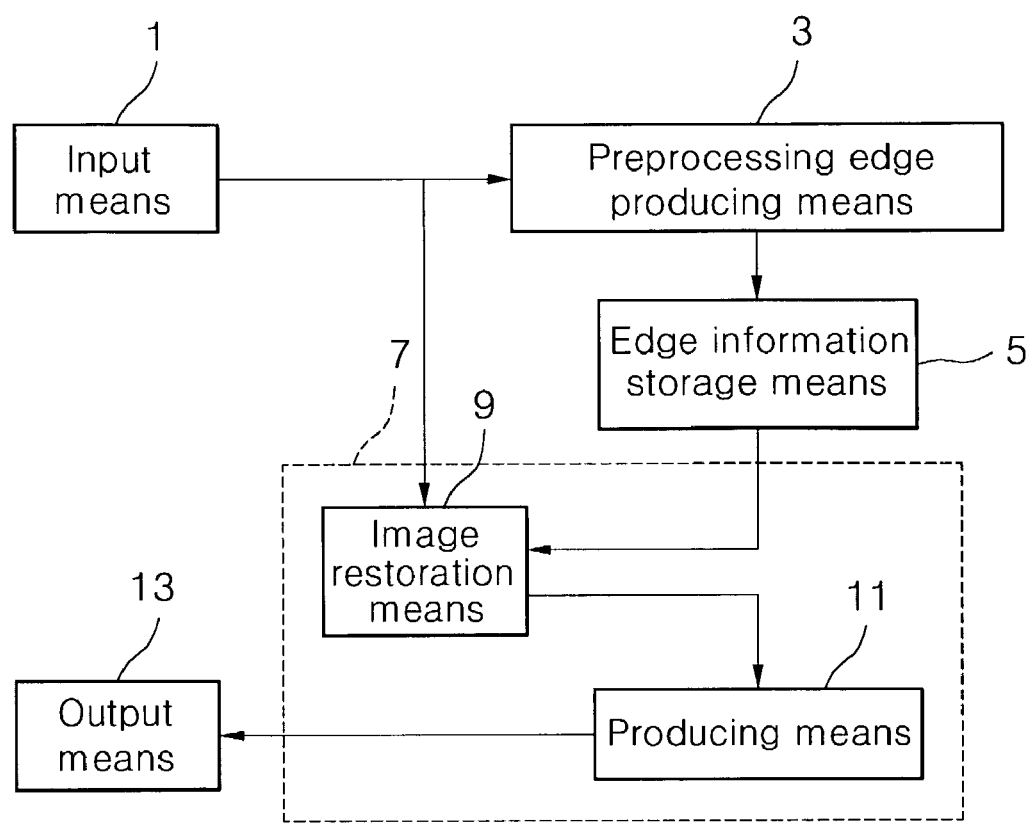
FIG. 8 illustrates the construction of the edge detection apparatus in accordance with a first embodiment of the present invention.

FIG. 8 illustrates the construction of the edge detection apparatus in accordance with a first embodiment of the present invention. Referring to FIG. 8, the edge detection apparatus in accordance with the first embodiment of the present invention includes a preprocessing edge producing means 3 for producing first edge information using two coefficients (AC01 and AC10) and a post-processing edge producing means 7 for producing second edge information using a spatial filter based on the first edge information. Additionally, the edge detection apparatus further includes an edge information storage means 5 for temporarily storing the first edge information.

The post-processing edge producing means 7 includes an image restoration means 9 for restoring an original image based on the block from which the first edge information is detected and a producing means 11 for producing second edge information using the spatial filter with respect to each of the blocks of the image restored by the image restoration means 9.

The operation of the edge detection apparatus in accordance with the first embodiment of the present invention will now be described. The original image inputted by the input means 1 is sent to the preprocessing edge producing means 3.

The preprocessing edge producing means 3 produces the first edge information using the absolute values and codes of the two coefficients (AC01, AC10) based on a plurality of blocks contained in the original image. Here, assuming that the first edge information has many blocks from which edges are detected, a plurality of edge information can be detected.

The first edge information produced by the preprocessing edge producing means 3 is stored in the edge information storage means 5.

Meanwhile, the original image is restored by the image restoration means 9 of the post-processing edge producing means 7. At this time, the image restoration means 9 receives the first edge information from the edge information storage manes 5 and restores the original image with respect to the blocks from which edges are detected based on the position or direction of the edges contained in the first edge information.

From the restored image, second edge information is produced by the producing means 11. That is, the producing means 11 produces the second edge information using the spatial filter with respect to each of the blocks of the restored image. The produced second edge information is processed to be generated as an edge image and outputted through an output means 13.

Figure 9:
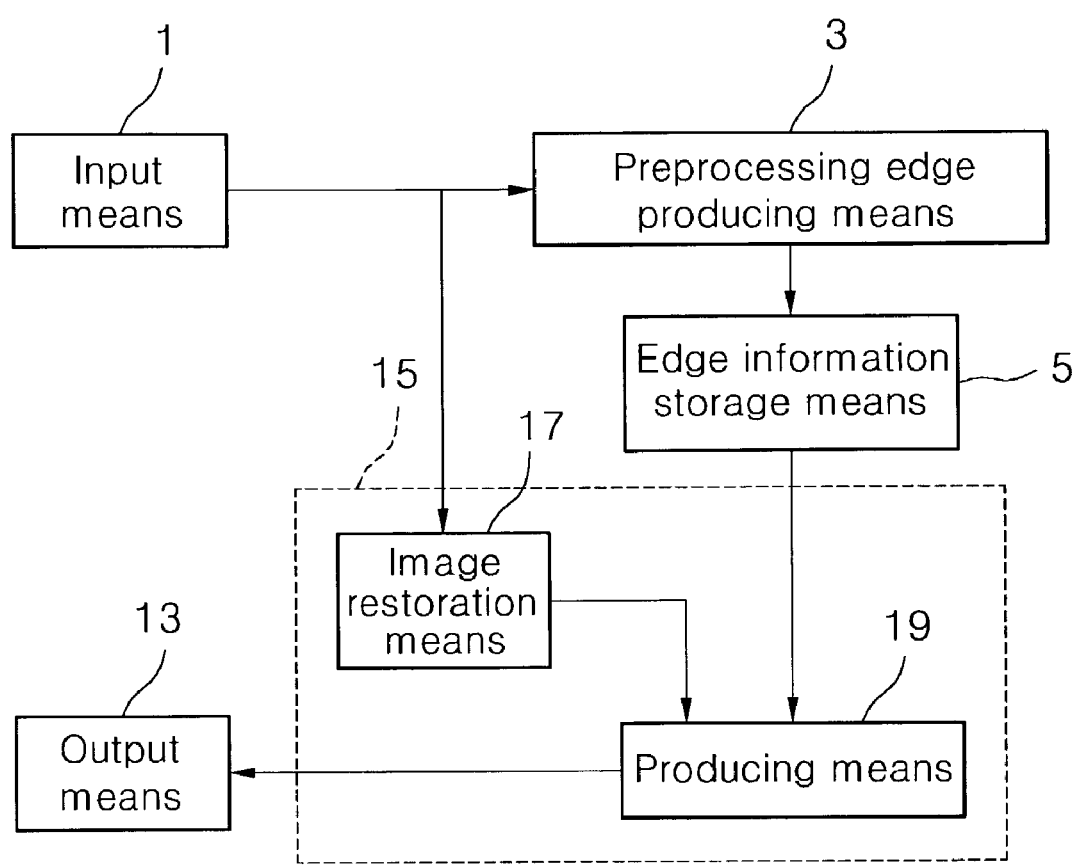
FIG. 9 illustrates the construction of the edge detection in accordance with a second embodiment of the present invention.

FIG. 9 illustrates the construction of the edge detection in accordance with a second embodiment of the present invention. In FIG. 9, same drawing reference numerals are used for the same elements in FIG. 8. Hereinafter, only the different parts from the parts of FIG. 8 will be explained.

Referring to FIG. 9, in the edge detection apparatus in accordance with the second embodiment of the present invention, the first edge information stored in the edge information storage means 5 is directly provided to the producing means 19 of the post-processing edge producing means 15.

In addition, the original image is restored by the image restoration means 17. This can be compared with the restoration of the original image referring to the first edge information as shown in FIG. 8.

The producing means 19 produces the second edge information by applying the spatial filter only with respect to the blocks in the restored image from which the first edge information is detected.

As described above, when edges are detected by two steps of pre-filtering and post-filtering, edges in the portion where very fine edges are positioned are removed, and more accurate edges are detected from the portion where dominant edges are present. If the execution time of the pre-filter is A and the execution time of the post-filter is B, the relation of A<<B is established. Additionally, if the ratio of edge blocks detected by the pre-filter is P (0<P<1), the total execution time becomes A+P×B. If P is 30%, the total execution time becomes approximately 0.3B, thus increasing the execution speed greatly as compared to when not using the pre-filter. Additionally, since the spatial filtering method generally uses one edge filter in order to detect a one-directional edge, it is necessary to scan an image by eight spatial filters in order to detect an eight-directional edge. Thus, the execution time is sharply descreased to approximately 0.3B/8, that is, 0.0375B.

In brief, in the edge detection method in accordance with the present invention, any dominant edge components in each of the blocks of the original image are accurately extracted by a rapid processing process in the compressed domain and thusly can be utilized as inputs in various image processing techniques using edges as inputs.

Further, by using the edge detection method using two AC coefficients in the DCT domain and the conventional edge detection method using the spatial filter, the execution speed can be sharply increased and accurate edges can be detected.

In the conventional edge detection method, a desired edge image can be extracted through a simple spatial filter. However, such a method is disadvantageous in that it is applicable to an uncompressed image and the entire image has to be scanned by the spatial filter to make the execution speed very low.

Thus, in accordance with the edge detection method of the present invention, b detecting edges in the DCT domain widely used in image or moving image compression, edge images can be provided as an input to a real time system where the most serious problem is its execution speed in accordance with the edge detection method of the present invention, since edges are extracted in eight directions, they can be used in most applications without difficulty.

Additionally, by using the edge detection method using two coefficients as the pre-filter and the edge detection method using the spatial filter as the post-filter, more rapid and accurate edges can be detected.

The foregoing embodiments and advantages are merely exemplary and are not to be construed as limiting the present invention. The present teaching can be readily applied to other types of apparatuses. The description of the invention is intended to be illustrative, and not to limit the scope of the claims. Many alternatives, modifications, and variations will be apparent to those skilled in the art.

What is claimed is:

1. A method for detecting an edge, which produces edge information, the method comprising:
   determining a direction of the edge by comparing an absolute value of a first edge coefficient (AC01) indicating a first edge with an absolute value of a second edge coefficient (AC10) indicating a second edge, wherein the absolute value of the first edge coefficient indicates proximity to a vertical edge and the absolute value of the second edge coefficient indicates proximity to a horizontal edge; and
   determining an angle of the edge by comparing a code of the first edge coefficient with a code of the second edge coefficient;
   wherein, if the absolute value of the first edge coefficient is much larger than that of the second edge coefficient, vertical edge information is produced.

2. The method according to claim 1, wherein the edge information is a strength, position or direction of an edge.

3. The method according to claim 1, wherein the edge information is mapped with an eight-directional edge index comprising horizontal, vertical and diagonal lines.

4. A method for detecting an edge, the method comprising:
   extracting a first edge coefficient (AC01) and a second edge coefficient (A10) reflecting an edge of an original image in a DCT domain;
   determining a direction of the edge by comparing an absolute value of the first edge coefficient (AC01) with an absolute value of the second edge coefficient (AC10), wherein the absolute value of the first edge coefficient indicates proximity to a vertical edge and the absolute value of the second edge coefficient indicates proximity to a horizontal edge;
   determining an angle of the edge by comparing a code of the first edge coefficient with a code of the second edge coefficient; and
   producing edge information on the original image according to the result of the comparisons;
   wherein, if the absolute value of the first edge coefficient is much larger than that of the second edge coefficient, vertical edge information is produced.

5. The method according to claim 4, wherein the first edge coefficient (AC01) indicates a first edge and the second edge coefficient (AC10) indicates a second edge.

6. The method according to claim 4, wherein the edge information is a strength, position or direction of an edge.

7. The method according to claim 4, wherein the edge information is mapped with an eight-directienal edge index comprising horizontal, vertical and diagonal lines.

8. The method according to claim 4, wherein, if the absolute value of the second edge coefficient is much larger than that of the first edge coefficient, horizontal edge information is produced.

9. The method according to claim 4, wherein, if the absolute value of the first edge coefficient is similar to that of the second edge coefficient and the code of the first edge coefficient is the same as that of the second edge coefficient, edge information inclined at around 45 degrees is produced.

10. The method according to claim 4, wherein, if the absolute value of the first edge coefficient is similar to that of the second edge coefficient and the code of the first edge coefficient is different from that of the second edge coefficient, edge information inclined at around 135 degrees is produced.

11. The method according to claim 4, wherein, if the absolute value of the second edge coefficient is larger than that of the first edge coefficient, the difference between them is larger than a first threshold value and the codes of the two edge coefficients are the same, edge information inclined at around 22.5 degrees is produced.

12. The method according to claim 4, wherein, if the absolute value of the second edge coefficient is larger than that of the first edge coefficient, the difference between them is larger than a first threshold value and the codes of the two edge coefficients are different, edge information inclined at around 157.5 degrees is produced.

13. The method according to claim 4, wherein, if the absolute value of the first edge coefficient is larger than that of the second edge coefficient, the difference between them is larger than a second threshold value and the codes of the two edge coefficients are the same, edge information inclined at around 67.5 degrees is produced.

14. The method according to claim 4, wherein, if the absolute value of the first edge coefficient is larger than that of the second edge coefficient, the difference between them is larger than a second threshold value and the codes of the two edge coefficients are the same, edge information inclined at around 112.5 degrees is produced.

15. A method for detecting an edge, the method comprising:
   producing first edge information by using absolute values and codes of a first edge coefficient (AC01) and a second edge coefficient (AC10) reflecting an edge for each of at least one block of an original image in a DCT domain, wherein a direction of the edge is determined by comparing an absolute value of the first edge coefficient (AC01) with an absolute value of the second edge coefficient (AC10), wherein the absolute value of the first edge coefficient indicates proximity to a vertical edge and the absolute value of the second edge coefficient indicates proximity to a horizontal edge, and an angle of the edge is determined by comparing a code of the first edge coefficient with a code of the second edge coefficient;
   storing the first edge information; and
   producing second edge information by using a spatial filter with respect to the original image based on the first edge information;
   wherein, if the absolute value of the first edge coefficient is much larger than that of the second edge coefficient, vertical edge information is produced.

16. The method according to claim 15, wherein the step of producing the second edge information comprises:
- restoring the original image based on the at least one block from which the first edge information is produced; and
- producing the second edge information by using the spatial filter with respect to each of the at least one block of the restored image.

17. The method according to claim 15, wherein the first edge coefficient indicates a first edge and second edge coefficient indicates a second edge.

18. The method according to claim 15, wherein the edge information is a strength, position or direction of an edge.

19. An apparatus for detecting an edge, comprising:
- a preprocessing edge producing means for producing first edge information by using absolute values and codes of a first edge coefficient (AC01) and a second edge coefficient (AC10) reflecting an edge for each of at least one block of an original image in a DCT domain, wherein a direction of the edge is determined by comparing an absolute value of the first edge coefficient (AC01) with an absolute value of the second edge coefficient (AC10), wherein the absolute value of the first edge coefficient indicates proximity to a vertical edge and the absolute value of the second edge coefficient indicates proximity to a horizontal edge, and an angle of the edge is determined by comparing a code of the first edge coefficient with a code of the second edge coefficient;
- an edge information storage means for storing the first edge information; and
- a post-processing edge producing means for producing second edge information by using a spatial filter with respect to the original image based on the first edge information;
- wherein, if the absolute value of the first edge coefficient is much larger than that of the second edge coefficient, vertical edge information is produced.

20. The apparatus according to claim 19, wherein the post-processing edge producing means comprises:
- an image restoration means for restoring the original image based on the at least one block from which the first edge information is produced; and
- a producing means for producing the second edge information by using the spatial filter with respect to each of the at least one block of the restored image.

21. The apparatus according to claim 19, wherein the first edge coefficient indicates a first edge and the second edge coefficient indicates a second edge.

22. The apparatus according to claim 19, wherein the edge information is a strength, position or direction of an edge.

* * * * *